Figure 1:
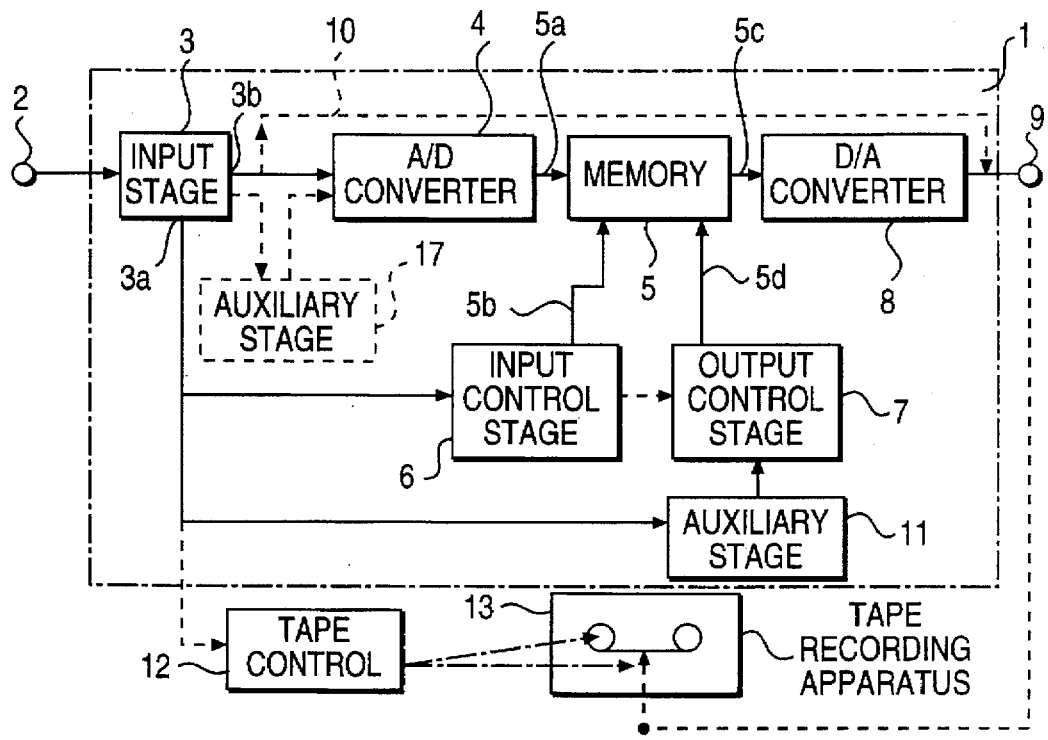

United States Patent [19]

Wijnen

[11] Patent Number: 5,673,356
[45] Date of Patent: Sep. 30, 1997

[54] METHOD AND AN APPARATUS FOR PREVENTING UNAUTHORIZED RECORDING ON TAPES ON VIDEO PROGRAMS

[75] Inventor: Arie Marinus Wijnen, Holargos, Greece

[73] Assignee: Copyguard Enterprises S.A., Luxembourg, Luxembourg

[21] Appl. No.: 378,105

[22] Filed: Jan. 26, 1995

Related U.S. Application Data

[63] Continuation of Ser. No. 690,953, files as PCT/EP89/01227, Oct. 10, 1989, abandoned.

[30] Foreign Application Priority Data

Oct. 11, 1988 [NL] Netherlands ............... 8802494

[51] Int. Cl.⁶ ............... H04N 5/76; H04N 7/167
[52] U.S. Cl. ............... 386/94; 380/10; 380/15; 380/12
[58] Field of Search ............... 358/335, 319, 358/310; 380/5, 10, 12, 15; 360/15, 27, 33.1, 37.1, 60; 386/94, 46; H04N 5/76, 7/167

[56] References Cited

U.S. PATENT DOCUMENTS

| | | | |
|---|---|---|---|
| 4,631,603 | 12/1986 | Ryan | 358/335 |
| 4,673,981 | 6/1987 | Lippman et al. | 348/512 |
| 4,819,098 | 4/1989 | Ryan | 358/335 |
| 4,907,093 | 3/1990 | Ryan | 358/335 |
| 5,130,810 | 7/1992 | Ryan | 358/335 |
| 5,187,589 | 2/1993 | Kono et al. | 358/335 |

FOREIGN PATENT DOCUMENTS 2 086 641 of 0000 United Kingdom.
8605057 of 0000 WIPO.

*Primary Examiner*—Khoi D. Truong
*Attorney, Agent, or Firm*—Larson and Taylor

[57] ABSTRACT

A method and apparatus are provided for preventing unauthorized recording of video programs on tape, in which the frame repetition frequency of the signals to be transmitted is changed in such a manner that, on the one hand, the operation of a television apparatus used for reproducing said signals will not be disturbed, but that, on the other hand, the cooperation between the driving means for the tape and the recording head displacement in the tape recording apparatus will be disturbed. The apparatus comprises an input stage (4) for digitalizing the video signals, a shift memory (5), an output stage (8) for converting the video signals to be used into analog form, an input control stage (6) for the memory (5) and an output control stage (7) for the memory (5). The control frequency of the input control stage (6) is adapted to the frame repetition frequency of the digitalized video signals to be stored in the memory (5). The control frequency of the output control stage (7) is different from the control frequency of the input control stage (6), and the capacity of the memory (5) is sufficient to compensate the differences between the signal input and output.

28 Claims, 1 Drawing Sheet

METHOD AND AN APPARATUS FOR PREVENTING UNAUTHORIZED RECORDING ON TAPES ON VIDEO PROGRAMS

This application is a continuation of application Ser. No. 07/690,953, filed as PCT/EP89/01227, Oct. 10, 1989 now abandoned.

When transmitting film programs over television channels, it is desirable to avoid, in view of copyrights and requirements set in this respect by the owners of the films, that, at the reception side, these films will be recorded on tape. To that end the video signals to be transmitted should be modified in such a manner that the operation of such recording apparatus will be disturbed so as to make the recorded pictures unsuitable for further use. This also holds for authorized recorded programs on tape, which tapes are to be sold or hired.

According to a first aspect of the invention this frequency change needs not be more than about 5% and will provide, then, such a disturbance of the operation of a recording apparatus that the recorded pictures are unusable. This change of the frame repetition frequency leads to a corresponding lengthening or shortening of the total program duration which is, however, not substantial. Of course the capacity of the memory used for this purpose should be adapted thereto.

Preferably the change of the frame repetition frequency will be changed around a mean value, in particular a deviation about a zero level. The advantage thereof is that, on the one hand the capacity of the memory can be smaller accordingly, and on the other hand, a substantial deviation of the sound in respect of the picture can be avoided without requiring adaptation means for the sound channel.

By using a time-base corrector, which, in principle, operates in the same manner as the above-mentioned apparatus, it remains possible to correct the frequency deviation. Such correctors are, as such, expensive, but nevertheless will be economically feasible if the profits of such tape recordings are sufficiently high. In order to prevent this, the method according to the invention provides that an additional line synchronization pulse is added after the color synchronization burst of the video signal described below. In the case of an authorised recording on tape of such video signals, the synchronization of the recording apparatus can be correctly controlled in the manner discussed below.

The invention further relates to an apparatus for performing the above-mentioned method.

The invention will be elucidated in more detail by reference to a drawing, showing in:

FIG. 1 a simplified block diagram of the apparatus of the invention; and

Figure 2A:
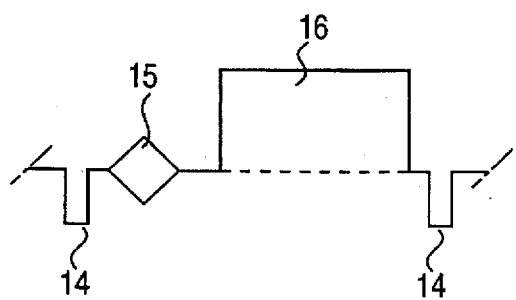
Figure 2B:
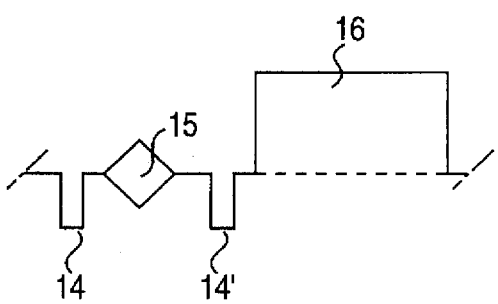

FIGS. 2A and 2B highly simplified representations of the portion of a composite video signal related to a picture line.

In FIG. 1 a simplified block diagram of the apparatus of the invention is shown within a block or frame 1 shown in chain lines. The structure of the various blocks thereof need not to be described in more detail, since, after having described the operation thereof, this structure will be clear to an expert.

The apparatus 1 comprises an input terminal 2 to which the video signal to be processed are to be supplied, which terminal is connected with the input of a first stage 3 by means of which the frame and line synchronisation signals present in the supplied video signals can be derived. These signals, are delivered at an output terminal $3a$, whereas, at a second output terminal $3b$, the complete video signals appear, i.e., are output. The output terminal $3b$ is connected to the input terminal of an analog digital (A/D) converter 4 which converts the analog video signals into digital signals. This signals are transferred to a first input $5a$ of a digital shift memory 5. With a second input $5b$ the output of an input control stage 6 is connected, which stage 6 provides that the digital signals will be introduced at the correct repetition frequency, i.e. the frame repetition frequency of the video signals, into the memory 5. This control stage 6 can be connected with the output $3a$ of the stage 3 so as to be tuned to the frame repetition frequency. In this manner the digitalised video signals will be introduced into the memory 5 at the correct repetition frequency.

The memory 5 has an output $5c$ which permits extracting the signals stored in the memory 5. Moreover a control input $5d$ is present which is connected with an output control stage 7 corresponding with the stage 6 but tuned to a different repetition frequency, this being done in such a manner that outputting the signals stored in the shift memory 5 will take place at the frequency of the stage 7.

The frequency of the stage 7 differs a little from the frequency of the stage 6, e.g. by not more than 5%. This means that the total duration of the video signal series extracted via the output $5c$ differs from the duration of the signals supplied to the input $5a$. If the output frequency is lower than the input frequency, outputting will last longer than inputting, so that the memory 5 should have a capacity corresponding to this difference. For a program of for instance 1 hr. a difference of 5% will mean a time difference of 3 min, so that the memory should be able to take up signals arriving during a 3 min. period. In the case of a faster outputting the memory must initially accumulate or store the difference.

The video signals appearing at the output $5c$ are restored to the analog form again by a digital/analog (D/A) converter 8, and are supplied to an output terminal 9 which, for instance, is connected with a transmission channel such as a television cable or the like.

If a tape recording apparatus were to be connected with this channel, the tape velocity will be adapted by the synchronisation circuits thereof to the frame repetition frequency of the incoming composite video signals, whereas the recording head which provides for recording along an oblique line on the tape is to be controlled in such a manner that a picture line will correspond with a recording line. Since the picture line length will not change, the line inclination will change. This means that, when reproducing the pictures recorded in this manner on the tape with the head control being adapted to a different inclination, a disturbance of the picture will take place, in a manner such that recorded tapes will be unusable. When directly reproducing these signals by means of a normal television apparatus no disturbance will take place.

Although this disturbance will be absolutely effective for counteracting unauthorized recording on tape of video signals, this method has still some draw-backs. For longer programs the difference in the duration thereof can become so large that the capacity of the memory would necessarily be substantial, which is, sometimes, objectionable. A more important objection is that the sound channel is separately processed as indicate diagrammatically at 10, and then no change of duration will take place, so that in the case of longer programs a disturbance of the synchronisation between picture and sound will take place. Changing the duration of the sound signal in the same manner is not impossible but is, nevertheless, objectionable.

In order to avoid these objections, the output control stage 7 can be connected with an auxiliary stage 11 providing for a periodical variation of the frequency deviation between the stages 6 and 7 around a central value, and in particular, the value zero. This stage 11 can be connected to that end with the output 3a.

In this manner the total duration of the signal series appearing at the output terminal 9 will be substantially equal to that of the signal series supplied to the input 2, so that not only no appreciable disturbance of the picture-sound synchronisation will occur, and, moreover, a considerably smaller memory 5 can be used, since the latter has only to take up a temporary compression or expansion of the signal.

When this disturbance is to be provided in authorised programs recorded on tape, the head and tape drive of the recording apparatus would, without additional measures, be disturbed in the same manner as in the case of an unauthorized recording. Therefore, as shown in FIG. 1, the head and tape control 12 of the used tape recording apparatus 13 will be controlled by signals derived from the output 3a, with the internal control then being switched off.

It is possible to cancel the above-mentioned repetition frequency changes by means of a time-base corrector which also comprises a digital memory and anolog/digital and digital/anolog converters. Such adaptors are, as such, very expensive, but can be economically justified if the profits of the unauthorised recordings are large.

In order to make the use of a time-base corrector impossible, a further disturbance of the video signals can be provided. FIG. 2A shows a simplified representation of the portion of a composite video signal corresponding to a picture line. This signal consists of a negative line synchronisation pulse 14 followed by a colour burst 15, which is followed by the positive picture element signals 16 which, for the sake of simplicity, are shown as a block. In order to disturb the time-base corrector, the line synchronisation pulse will, a shown in FIG. 2B at 14', be repeated after the colour burst 15. For a reproducing apparatus this has no consequences, but this is not the case for a time-base corrector which considers the second line synchronisation pulse 14' to be a new line synchronisation pulse. This also holds for tape recording apparatus, so that the operation thereof will be additionally disturbed.

This additional disturbance can be obtained in an auxiliary stage indicated in FIG. 1 at 17 by interrupted lines. A tape recording apparatus 13 for authorized use with a separate synchronisation control 12 will, then, not be disturbed.

A further disturbance can be obtained by varying the position and/or width of the repeated line synchronisation pulse 14'. In that case the automatic gain detector or automatic gain control of a recording apparatus will be disturbed, which will lead to further disturbance of the picture.

I claim:

1. An apparatus for processing video signals so as to prevent unauthorized recording thereof on tape, said apparatus including an apparatus output and comprising an input stage, connected to an input of the apparatus, for receiving video signals to be processed and including means for separating synchronization signals from the video signals to be processed to produce separated synchronization signals at an output of said input stage, an A/D converter for receiving said video signals from a first output of said input stage and for producing corresponding digitized video signals, a digital memory for receiving the digitized video signals from said A/D converter, a A/D converter, connected to an output of said memory and having an output connected to said apparatus output, a first control stage for controlling writing of said video signals in said memory under control of said separated synchronization signals at said output of said input stage, and a second control stage for controlling reading out of said stored signals from said memory, said memory comprising a digital shift memory means for expanding and compressing signals in a frame area without adding lines or suppressing lines from the frames of said signals, and said second control stage providing a reading frequency which is different from the writing frequency of said first control stage, the capacity of said digital shift memory means being sufficient to compensate for differences between the video signal input and output, said video signals comprising picture lines each comprising a color burst and a horizontal synchronization pulse in advance of said color burst and said apparatus further comprising an additional means for introducing an additional horizontal line synchronization pulse into the video signal after said color burst.

2. The apparatus of claim 1, wherein the second control stage is connected to a frequency control stage for varying the control frequency of said second control stage around a mean value of frequency.

3. The apparatus of claim 1, wherein the additional means comprises means for varying the position of the additional line synchronization pulse.

4. The apparatus of claim 1, wherein the additional means comprises means for varying the width of the additional line synchronization pulse.

5. The apparatus of claim 1 wherein the additional means comprises means for varying the position and width of the additional line synchronization pulse.

6. The apparatus of claim 1, wherein the synchronization signal output is also connected with a synchronization circuit of a tape recording apparatus to be connected with the output of the apparatus, and the synchronization signals separating means of said input stage of the apparatus being switched off when said synchronization signal output is so connected.

7. A method for preventing unauthorized recording of composite video signals of video programs on tape wherein the frame lengths of the composite video signals of such programs are varied in order to disturb the operation of a tape recording apparatus used to record said signals, said method comprising the steps of storing said signals in a digital memory with a different frame length, and recovering said signals from said memory, signals in a frame area being expanded and compressed respectively without adding lines to or suppressing lines from the frames of said signals, and said video signals being read out of said memory at a different frequency which is different from that at which the signals are written into said memory, said video signals each including a color burst preceded by a line synchronization signal and the method further comprising the step of adding a further line synchronization signal after the color burst so as to disturb synchronization of a time based corrector used in attempting to cancel the frequency change to said different frequency.

8. The method of claim 7, wherein in the frame lengths are continuously varied around a mean frame length.

9. The method of claim 8, wherein the mean frame length comprises the normal frame length.

10. The method of claim 7 wherein the video signals each include a color burst preceded by a line synchronization signal and the method further comprising the step of adding a further line synchronization signal after the color burst so as to disturb synchronization of a time based corrector used in attempting to cancel the frequency change to said different frequency.

11. The method of claim 10, wherein the position of the added line synchronization pulse is varied.

12. The method of claim 10, wherein the width of the added line synchronization pulse is varied.

13. The method of claim 10, wherein both the position and width of the added line synchronization pulse are varied.

14. The method of claim 7 wherein the method is used for authorized recording of video signals on tape and wherein, before the change of the repetition frequency, the synchronization signals are separated and are separately applied to the recording apparatus in order to synchronize the recording apparatus when recording the video signals with the changed repetition frequency.

15. An apparatus for processing video signals so as to prevent unauthorized recording thereof on tape, said video signals comprising a color burst and a horizontal synchronization pulse in advance of said color burst, said apparatus including an apparatus output and comprising an input stage, connected to an input of the apparatus, for receiving video signals to be processed and including means for separating synchronization signals from the video signals to be processed to produce separated synchronization signals at an output of said input stage, an A/D converter for receiving said video signals from a first output of said input stage and for producing corresponding digitized video signals, a digital memory for receiving the digitized video signals from said A/D converter, a D/A converter, connected to an output of said memory and having an output connected to said apparatus output, a first control stage for controlling writing of said video signals in said memory under control of said separated synchronization signals at said output of said input stage, and a second control stage for controlling reading out of said stored signals from said memory, said memory comprising a digital shift memory, said second control stage providing a reading frequency which is different from the writing frequency of said first control stage, the capacity of said digital shift memory being sufficient to compensate for differences between the video signal input and output, and said apparatus further comprising an additional means for introducing an additional horizontal line synchronization pulse into the video signals after said color pulse.

16. A method for preventing unauthorized recording of composite video signals of video programs on tape wherein the frame lengths of the composite video signals of such programs are varied in order to disturb the operation of a tape recording apparatus used to record said signals, said method comprising the steps of digitizing said signals, storing said signals in a digital memory with a different frame length, and recovering said signals from said memory in analog form, said video signals being read out of said memory at a different frequency which is different from that at which the signals are written into said memory, the video signals each including a color burst preceded by a line synchronization signal, and the method further comprising the step of adding a further line synchronization signal after the color synchronization burst so as to disturb synchronization of a time-base corrector used in attempting to cancel the frequency change to said different frequency.

17. In a method for preventing unauthorized recording of video programs on tape, said video programs comprising video signals including synchronizing signals comprising a line synchronizing signal preceding a color burst, said method comprising changing the frame repetition frequency of the video signals for the video program in such a manner that the operation of a tape recording apparatus for recording thereof will be disturbed, the frame repetition frequency of the signals to be transmitted being changed in a manner such that the operation of a television apparatus used for reproducing said video signals will not be disturbed but such that cooperation between the driving means for the tape and recording head displacement in the tape recording apparatus will be disturbed, the improvement wherein the method further comprises the step of adding, to the video signals, a further line synchronization signal after each color burst so as to disturb the synchronization of a time-base corrector used for cancelling the change in the frame repetition frequency.

18. The method of claim 17, wherein the change of the frame repetition frequency is continuously changed around a mean frequency deviation.

19. The method of claim 17, wherein the change of the frame repetition frequency is continuously changed around a deviation of about zero.

20. The method of claim 17, where the position of the further line synchronization signal is varied.

21. The method of claim 17, where the width of the further line synchronization signal is varied.

22. The method of claim 17, wherein the method is used for providing authorized recording of video signals by a tape recording apparatus, and wherein, before the change of the frame repetition frequency, the synchronization signals are separated from the video signals and are applied separately to the tape recording apparatus so as to synchronize the recording apparatus when recording the video signals with the changed frame repetition frequency.

23. The method of claim 17, wherein said video signals comprise a picture line and only a single horizontal synchronization pulse is added to each picture line.

24. A method for preventing unauthorized recording of composite video signals on tape wherein, said method comprising receiving video signals comprising a picture line comprising a color burst and a horizontal synchronization pulse in advance of said color burst, and adding to each video signal an additional horizontal synchronization pulse, each additional horizontal synchronization pulse being added after the color burst of each composite video signal so as to disturb synchronization of a device used in attempting unauthorized copying of the video signals.

25. The method of claim 24, wherein the position of the additional horizontal synchronization pulse is varied in successive video signals.

26. The method of claim 24, wherein the width of the additional horizontal synchronization pulse is varied in successive video signals.

27. The method of claim 24, wherein both the position and width of the additional horizontal synchronization pulse are varied in successive video signals.

28. The method of claim 24, wherein only a single horizontal synchronization pulse is added to each picture line.

* * * * *